US010021150B2

(12) United States Patent
Walsh

(10) Patent No.: US 10,021,150 B2
(45) Date of Patent: Jul. 10, 2018

(54) SYSTEMS AND METHODS OF ESTABLISHING AND MEASURING TRUST RELATIONSHIPS IN A COMMUNITY OF ONLINE USERS

(71) Applicant: Christopher J. Walsh, Owings Mills, MD (US)

(72) Inventor: Christopher J. Walsh, Owings Mills, MD (US)

(73) Assignee: Wyngspan, Inc., Braintree, MA (US)

( * ) Notice: Subject to any disclaimer, the term of this patent is extended or adjusted under 35 U.S.C. 154(b) by 608 days.

(21) Appl. No.: 14/067,145

(22) Filed: Oct. 30, 2013

(65) Prior Publication Data

US 2014/0122603 A1 May 1, 2014

Related U.S. Application Data

(60) Provisional application No. 61/721,094, filed on Nov. 1, 2012.

(51) Int. Cl.
*G06F 15/16* (2006.01)
*H04L 29/06* (2006.01)
(Continued)

(52) U.S. Cl.
CPC ....... *H04L 65/403* (2013.01); *G06Q 30/0282* (2013.01); *G06Q 50/01* (2013.01)

(58) Field of Classification Search
CPC .... G06Q 10/10; H04L 29/06; H04L 29/08072
(Continued)

(56) References Cited

U.S. PATENT DOCUMENTS 7,703,030 B2    4/2010  Smirin et al.
8,126,820 B1    2/2012  Talan et al.
(Continued)

FOREIGN PATENT DOCUMENTS

KR    1020110117475 A    10/2011
WO      2006050278 A2     5/2006

OTHER PUBLICATIONS

International Search Report from corresponding PCT application No. PCT/US2013/067489 mailed Feb. 27, 2014, total pp. 5.

*Primary Examiner* — Alan S Chou
(74) *Attorney, Agent, or Firm* — Chapin IP Law, LLC

(57) ABSTRACT

Systems and methods for establishing and measuring trust relationships in a community of online users. In the systems and methods, indications of the trustworthiness of members of an online community, and/or other resources within or outside of the online community, can be obtained that are dependent not only upon the perceived trustworthiness of the respective online community members and/or other resources themselves, but also the perceived trustworthiness of others within the online community who have deemed those respective online community members and/or other resources as being trustworthy. Such indications of the trustworthiness of online community members and/or other resources are measurements that can be strengthened as the trustworthiness of others within the online community with whom trust relationships have been established increases. In this way, the usefulness of such indications of the trustworthiness of online community members and/or other resources can be enhanced.

19 Claims, 6 Drawing Sheets

(51) Int. Cl.
*G06Q 30/02* (2012.01)
*G06Q 50/00* (2012.01)

(58) Field of Classification Search
USPC .......................................................... 709/204
See application file for complete search history.

(56) References Cited

U.S. PATENT DOCUMENTS

2007/0143281 A1* 6/2007 Smirin .............. G06F 17/30867
2010/0250605 A1 9/2010 Pamu et al.
2011/0047213 A1* 2/2011 Manuel .................. G06Q 30/00
709/204
2011/0252121 A1 10/2011 Borgs et al.

* cited by examiner

SYSTEMS AND METHODS OF ESTABLISHING AND MEASURING TRUST RELATIONSHIPS IN A COMMUNITY OF ONLINE USERS

CROSS REFERENCE TO RELATED APPLICATIONS

This application claims benefit of the priority of U.S. Provisional Patent Application No. 61/721,094 filed Nov. 1, 2012 entitled TRUST/RECOMMENDATION NETWORK.

TECHNICAL FIELD

The present application relates generally to social networking systems and methods, and more specifically to systems and methods of establishing and measuring trust relationships in a community of online users.

BACKGROUND

The continued expansion of the Internet has led to the establishment of a multitude of online social networking communities with members having such diverse interests as business, sports, technology, dating, parenting, real estate, etc. In a typical online scenario, an online user may receive an invitation over the Internet from a friend or colleague to join a particular online community, or may seek to join the online community on his or her own accord. As part of the process of joining the online community, the online user may be required to set up an account including a username and a password, as well as a personal profile listing his or her activities, interests, education, employment positions, experiences, company, organization, etc. Once the account is set up, the online user can add contacts to his or her personal network within the online community by sending invitations over the Internet to friends and/or colleagues who may accept the invitations, and, in a likewise fashion, may add contacts to their own personal networks within the online community. In this way, a vast social network of online users can be created, in which each online user can have a number of direct contacts within his or her own personal network, and possibly a number of indirect contacts through others within the online social networking community.

In recent years, it has become increasingly common for online users to use their memberships in online communities to obtain answers to certain questions, and/or to identify providers of certain services, from among the members of the respective online communities. For example, a homeowner may seek to obtain an answer regarding how best to approach a difficult home repair project, or a young couple may wish to identify a real estate agent for purchasing their first home in a desirable neighborhood. To those ends, the homeowner and/or the young couple may submit one or more queries to search a database of their online membership community, ultimately obtaining one or more listings of search results that may or may not contain information that is most useful to the homeowner or young couple.

One factor that the homeowner or young couple may consider in determining the value of such information obtained in a database search of their online membership community is the trustworthiness of the source of the information. For example, in response to the homeowner's query pertaining to the difficult home repair project, a listing of search results may include the uniform resource locators (URLs) of websites belonging to a number of local contractors. Likewise, in response to the young couple's query pertaining to the real estate agent, a listing of search results may include the URLs of websites belonging to a number of local real estate offices. To obtain an indication of the trustworthiness of such local contractors or real estate offices, the online community may employ a conventional reputation system that allows its members to compose testimonials about the respective contractors or real estate offices, and/or to rate or endorse the respective contractors or real estate offices. The reputation system may then store the members' testimonials, ratings, and/or endorsements in association with public profiles of the respective contractors or real estate offices in the database of the online membership community.

However, such testimonials, ratings, and/or endorsements provided through conventional reputation systems may have questionable value, particularly in view of the fact that that members of online social networking communities often do not have direct or even indirect contact with one another outside of the online community, and therefore may have limited personal experience with and/or knowledge of the various individuals, service providers, and/or companies and organizations within the online community. Moreover, such ratings and/or endorsements are typically provided with reference to a scale (e.g., star ratings, letter grades), which provide little information about what is actually being rated and/or endorsed (e.g., a particular employee, an individual experience, cleanliness, etc.). As a result, the members of such online communities may find it difficult to rely upon and have confidence in (i.e., "trust") the sources of the information they may receive, for example, in response to database searches of their online membership communities.

SUMMARY

In accordance with the present application, systems and methods are disclosed for establishing and measuring trust relationships in a community of online users. In the disclosed systems and methods, indications of the trustworthiness of members of an online community, and/or other resources within or outside of the online community (e.g., individuals, companies, organizations, uniform resource locators (URLs), web logs ("blogs"), products, books, files, etc.), can be obtained that are dependent not only upon the perceived trustworthiness of the respective online community members and/or other resources, but also the perceived trustworthiness of others within the online community who have deemed those respective online community members and/or other resources as being trustworthy. Such indications of the trustworthiness of online community members and/or other resources are measurements that can be strengthened as the trustworthiness of others within the online community with whom trust relationships have been established increases. In this way, the usefulness of such indications of trustworthiness of online community members and/or other resources can be enhanced.

In one aspect, an online user who is a member of an online community (e.g., an individual, company, or organization) can issue a trust indication (also referred to herein as a "trust") to another member of the online community (e.g., another individual, company, or organization), or receive a trust from another member of the online community, thereby establishing a trust relationship with the trust issuer. Such a trust is defined herein as an electronic entity (e.g., an aggregation of data) configured to indicate that the recipient of the trust is considered by the trust issuer to be an individual/company/organization that can be relied upon and is worthy of confidence.

Once such a trust relationship is established between the trust issuer and the trust recipient, the disclosed systems and methods operate to determine a number of "trust points" for the trust recipient. Such trust points are determined based at least on the current total number of trusts received by the trust recipient, as well as the quality of the respective trusts received by the trust recipient. In an exemplary aspect, the quality of a trust can be based at least in part on the number of trusts received by the trust issuer with regard to an associated category grouping of the online community. Such a category grouping can be defined by the trust issuer's occupation, specialization, line of business, industry, etc., as specified in a profile of the trust issuer. For example, the trust issuer may wish to promote him or herself to the members of the online community within a category grouping defined by his or her occupation, e.g., real estate agents. A trust that is issued by a trust issuer who has received a high number of trusts with regard to a particular category grouping, such as real estate agents, is considered to be of higher quality than a trust that is issued by another trust issuer who has received a lower number of trusts with regard to that same category grouping. In a further exemplary aspect, such trust points can be weighted to account for trusts issued by individuals versus trusts issued by companies or organizations (which may receive a significantly higher number of trusts over time than individuals with regard to a particular category grouping of the online community), to account for trusts issued by large companies or organizations versus trusts issued by smaller companies or organizations, or any other suitable factor or consideration.

Having determined the number of trust points (or weighted trust points) for the trust recipient, the disclosed systems and methods operate to determine a trust point rank (or weighted trust point rank) for the trust recipient within the category grouping associated with the trust recipient, as well as a trust factor for the trust recipient based at least on the trust recipient's trust point rank and the total number of members of the online community within that same category grouping. In the event a member of the online community subsequently submits a query to search a database of the online membership community (e.g., to obtain an answer to a certain question, or to identify a provider of a certain service), and, in response to the search query, obtains a listing of search results that makes reference to the trust recipient as a source of information, the rank of the information associated with the trust recipient in the search results can be based at least in part on the value of the trust factor associated with the trust recipient.

In another exemplary aspect, in the event the trust issuer does not have any trusts with regard to an associated category grouping of the online community (e.g., the trust issuer may be acting in the role of a consumer, and/or may not be promoting him or herself in a particular category grouping), the current total number of "contribution points" designated, assigned, or otherwise awarded to the trust issuer is taken into consideration for the purpose of determining the quality of the issued trust. In the disclosed systems and methods, one or more contribution points can be awarded to such a trust issuer in response to certain actions performed by the trust issuer within the online community, such as joining the online community, adding contacts to the trust issuer's network within the online community, issuing trusts to other members of the online community, etc. The quality of the trust issued by the trust issuer can then be based at least in part on the number of contribution points awarded to the trust issuer relative to the numbers of contribution points awarded to other online community members who, like the trust issuer, may be acting in the role of consumers, and/or may not be promoting themselves in particular category groupings of the online community.

By allowing members of an online community to issue trusts to other members of the online community and/or other resources within or outside of the online community, and determining trust factors for the trust recipients that are dependent not only upon the perceived trustworthiness of the respective trust recipients themselves, but also the perceived trustworthiness of others within the online community who have issued trusts to those respective trust recipients, the usefulness of such trust factors as being indicative of the trustworthiness of the respective trust recipients is enhanced.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein and, together with the Detailed Description, explain these embodiments. In the drawings.

DETAILED DESCRIPTION

The disclosure of U.S. Provisional Patent Application No. 61/721,094 filed Nov. 1, 2012 entitled TRUST/RECOMMENDATION NETWORK is hereby incorporated herein by reference in its entirety.

Systems and methods are disclosed for establishing and measuring trust relationships in a community of online users. In the disclosed systems and methods, indications of the trustworthiness of members of an online community and/or other resources within or outside of the online community (e.g., individuals, companies, organizations, uniform resource locators (URLs), web logs ("blogs"), products, books, files, etc.) can be obtained that are dependent not only upon the perceived trustworthiness of the respective online community members and/or other resources, but also the perceived trustworthiness of others within the online community who have deemed those respective online community members and/or other resources as being trustworthy. Such indications of the trustworthiness of online community members and/or other resources are measurements that can be strengthened as the trustworthiness of others within the online community with whom trust relationships have been established increases. In this way, the usefulness of such indications of the trustworthiness of online community members and/or other resources can be enhanced.

Figure 1:
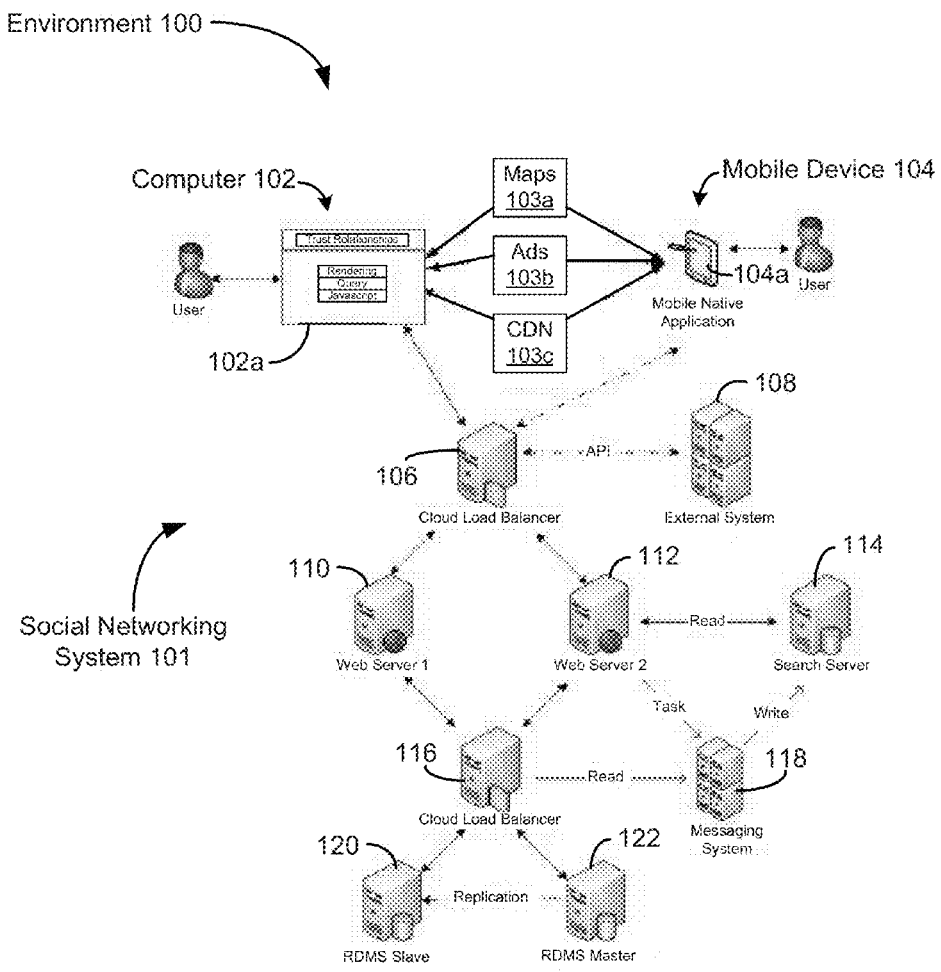
FIG. 1 is a block diagram of an exemplary environment in which an exemplary system for establishing and measuring trust relationships in a community of online users can be implemented, in accordance with the present application.

FIG. 1 depicts an exemplary environment 100 in which an illustrative social networking system 101 for establishing and measuring trust relationships in a community of online users can be implemented, in accordance with the present application. As shown in FIG. 1, the environment 100 includes the system 101, which, in turn, includes at least one user computer 102, at least one user mobile device 104, and one or more application/web servers 110, 112. For example, the user computer 102 can be a personal computer or any other suitable computer or computerized device configured to run a Windows, Macintosh, UNIX, Linux, or any other suitable operating system, equipped with a web browser application capable of connecting to the Internet, and/or any other suitable public or private, wired or wireless network. Further, the user mobile device 104 can be a laptop computer, a tablet computer, a smart phone, or any other suitable computerized mobile device configured to run a Windows, iOS, Android, or any other suitable operating system, equipped with a native mobile application likewise capable connecting to the Internet, and/or any other suitable public or private, wired or wireless network. At least the respective application/web servers 110, 112 can include at least one processor and at least one memory for executing business logic to implement the social networking system 101 within the environment 100. It is noted, however, that such business logic can be distributed in any suitable fashion among the various computer hardware and/or software components and/or devices that constitute the social networking system 101.

In the environment 100 (see FIG. 1), a cloud load balancer 106 may be employed to distribute processing workloads across the respective application/web servers 110, 112 for maximizing throughput, minimizing response time, and/or avoiding overload for the respective user computer(s) and mobile device(s) 102, 104 operating within the system 101. In one embodiment, at least one application programming interface (API) can be provided to allow the system 101 to be integrated, via the cloud load balancer 106, with at least one external application (e.g., Google.com, Facebook.com, Factual.com) running on at least one external computer system 108. One or more additional APIs can also be provided to allow the system 101 to be integrated, via the respective user computer(s) and mobile device(s) 102, 104, with an external maps application 103a (e.g., Google Maps), an external ads application 103b (e.g., Google Adsense), or any other suitable external application(s). It is noted that the respective user computer(s) and mobile device(s) 102, 104 can also be communicably coupled to any suitable content delivery or distribution network (CDN) 103c.

As further shown in FIG. 1, the environment 100 can include a relational database management system 120, 122, a messaging system 118, and a search server 114. The relational database management system (RDMS) 120, 122 (e.g., MySQL Slave, MySQL Master) can be configured to manage the database of the online membership community within the environment 100. A cloud load balancer 116 communicably coupled to the application/web servers 110, 112 may be employed to distribute processing workloads across the relational database management system 120, 122. The messaging system 118 (e.g., RabbitMQ) communicably coupled to the cloud load balancer 116 and the application/web servers 110, 112 can be provided to facilitate scaling of the database of the online membership community over time. The search server 114 (e.g., Elastic Search) communicably coupled to the messaging system 118 and the application/web servers 110, 112 can also be provided to facilitate searching of various kinds of documents during operation of the system 101.

It is noted that FIG. 1 illustrates an exemplary embodiment of the environment 100 in which the system 101 for establishing and measuring trust relationships in a community of online users can be implemented, and that other embodiments of the environment 100 may include more system components, or fewer system components, than the system components illustrated in FIG. 1. Further, the system components may be arranged differently than as illustrated in FIG. 1. In addition, functions performed by the various system hardware and/or software components contained in other embodiments of the environment 100 may be distributed among the respective system components differently than as described herein.

The operation of the social networking system 101 for establishing and measuring trust relationships in a community of online users will be further understood with reference to the following illustrative example. It is noted that, in this illustrative example, the overall functionality of the system 101 is controlled by the business logic executed by at least the application/web servers 110, 112 within the environment 100. In this example, an online user interacting with the user computer 102 or the user mobile device 104 may receive (e.g., via an email message, a text message) an invitation over the Internet from a friend or colleague to join a particular online community, or may seek to join the online community on his or her own accord. For example, members of the online community may have such diverse interests as business, sports, technology, real estate, etc.

As part of the process of joining the online community, the online user can be required to set up an account including, for example, a first and last name, an email address, and a password, as well as a profile optionally listing his or her education, profession, employer, etc. For example, using the user computer or mobile device 102, 104, the online user may set up the account in his or her capacity as an individual, or as a representative of a company or organization. Further, the online user may specify, in his or her profile, a category grouping in which to promote him or herself to the members of the online community. Such a category grouping can be defined by the online user's occupation, specialization, line of business, industry, etc., as specified in the profile. For example, the online user may wish to promote him or herself to the members of the online community within a category grouping defined by his or her occupation, e.g., real estate agents.

In one embodiment, such category groupings can be arranged in a tree structure, in which a top-level category grouping is specified with regard to one or more lower-level category sub-groupings. For example, such a top-level category grouping can be defined by the general field of medicine, which can be specified with regard to the lower-level category sub-groupings, "Doctors" and "Nurses". Further, the category sub-grouping, Doctors, can be further specified with regard to the lower-level category sub-grouping, "Surgeons", which, in turn, can be further specified with regard to the lower-level category sub-groupings, "Neurosurgeons" and "General surgeons". It is noted that any other suitable category grouping(s) arranged in any other suitable tree structure(s) may be employed.

Once the account is set up, the online user can add contacts to his or her personal network within the online community. For example, using the user computer or mobile device 102, 104, the online user may send (e.g., via email messages, social network invitation) invitations over the Internet to friends and/or colleagues who may choose to accept (or refuse to accept) the invitations, and, in a likewise fashion, may add contacts to their own personal networks within the online community. Using the user computer or mobile device 102, 104, the online user may also establish a trust relationship with at least one member of the online community by issuing (e.g., via the web application, the mobile application) a trust indication (also referred to herein as a "trust") to the online community member, or by receiving a trust from an online community member. Such a trust is defined herein as an electronic entity (e.g., an aggregation of data) configured to indicate that the online user (the "trust issuer") considers the online community member to whom the trust is issued and who subsequently receives the trust (the "trust recipient") to be an individual/company/organization/resource that can be relied upon and is worthy of confidence. In one embodiment, such a trust indication can be posted online or otherwise publicly disclosed within the online community, but can be subsequently recalled by the trust issuer, or declined by the trust recipient, after such posting.

Once the trust relationship is established between the trust issuer and the trust recipient, the business logic is executed within the system 101 to calculate, compute, generate, obtain, or otherwise determine a number of "trust points" for the trust recipient. Such trust points are determined based at least on the quantity or current total number of trusts received and not declined by the trust recipient (and not recalled by the trust issuer), as well as the quality of the respective trusts received and not declined by the trust recipient (and not recalled by the trust issuer). In one embodiment, the quality of a trust is based at least in part on the current total number of trusts received by the trust issuer with regard to the category grouping (or sub-grouping) that the trust issuer has chosen to promote him or herself to the members of the online community. In this illustrative example, the trust issuer has chosen to promote him or herself within the category grouping of real estate agents. The trust point rank is determined based at least in part on the current total number of trusts received by the trust issuer with regard to the category grouping of real estate agents. In general, a trust that is issued by a trust issuer who has a high number of trusts with regard to a particular category grouping (or sub-grouping), such as real estate agents, is considered to be of higher quality than a trust that is issued by another trust issuer who has a lower number of trusts with regard to that same category grouping (or sub-grouping). In one embodiment, such trust points can be weighted to account for trusts issued by individuals versus trusts issued by companies or organizations (which may receive a significantly higher number of trusts over time than individuals within a particular category grouping (or sub-grouping) of the online community), to account for trusts issued by large companies or organizations versus trusts issued by smaller companies or organizations, or any other suitable factor or consideration.

Having determined the number of trust points (or weighted trust points) for the trust recipient, the business logic is executed within the system 101 to calculate, compute, generate, obtain, or otherwise determine a trust point rank (or weighted trust point rank) for the trust recipient within the category grouping (or sub-grouping) associated with the trust recipient, as well as a trust factor for the trust recipient based at least on the trust recipient's trust point rank and the total number of members of the online community within that same category grouping (or sub-grouping). For example, like the trust issuer, the trust recipient may have chosen to promote him or herself to the members of the online community within a category grouping defined by his or her profession, e.g., accountants. Accordingly, the trust point rank (or weighted trust point rank) for the trust recipient may be determined within the category grouping of accountants, and the trust factor for the trust recipient may be determined based at least on the trust recipient's trust point rank and the total number of members of the online community within the category grouping of accountants.

In one embodiment, in the event the trust issuer does not have any trusts with regard to an associated category grouping (or sub-grouping) of the online community (e.g., the trust issuer may be acting in the role of a consumer, and/or may not be promoting him or herself in a particular category grouping or sub-grouping), the current total number of "contribution points" designated, assigned, or otherwise awarded to the trust issuer can be taken into consideration for the purpose of determining the quality of an issued trust. In one embodiment, the business logic can be executed within the system 101 to award one or more contribution points to such a trust issuer in response to certain actions performed by the trust issuer within the online community, such as joining the online community, adding contacts to the trust issuer's network within the online community, issuing trusts to other members of the online community, etc. The quality of the trust issued by such a trust issuer can then be based at least in part on the number of contribution points awarded to the trust issuer relative to the numbers of contribution points awarded to other online community members who, like the trust issuer, may be acting in the role of consumers, and/or may not be promoting themselves in particular category groupings or sub-groupings of the online community.

The determination of the weighted trust points, the trust point rank, and the trust factor for the trust recipient within the social networking system 101 will be further understood with reference to the following example. In this example, it is assumed that the trust recipient (e.g., an accountant) has received a single trust from the trust issuer (e.g., a real estate agent), and that this single trust is the only trust that the trust recipient has received. The trust points for the trust recipient can be determined using a first trust point value, TP1, relating to the quantity of trusts received by the trust recipient, as well as a second trust point value, TP2, relating to the quality of the trusts received by the trust recipient. In one embodiment, a default number of trust points can be allocated to each trust received by a trust recipient, such as 100 or any other suitable number of trust points. Accordingly, in this example, the first trust point value, TP1, can be determined, as follows:

$$TP1 = TOT \times 100 \quad (1)$$

in which "TOT" corresponds to the total number of trusts received by the trust recipient (the accountant). In this case, the total number of trusts, TOT, is equal to 1 (i.e., the single trust received from the trust issuer, i.e., the real estate agent), and therefore the first trust point value, TP1, can be determined, as follows:

$$TP1 = 1 \times 100,$$

$$TP1 = 100. \quad (2)$$

In one embodiment, a maximum number of quality points can be allocated to each trust received by a trust recipient, such as 200 or any other suitable number of quality points. Accordingly, in this example, the second trust point value, TP2, can be determined, as follows:

$$TP2 = TQR \times 200, \quad (3)$$

in which "TQR" corresponds to a trust quality rank of the trust issuer (the real estate agent).

In this example, it is assumed that the category grouping in which the trust issuer has chosen to promote him or herself (i.e., the category grouping of real estate agents) includes a total of 5 real estate agents (including the trust issuer), and that the trust issuer has received the lowest number of trusts in this category grouping of real estate agents. In this case, the total number of trusts received by the trust issuer falls within the $20^{th}$ percentile in the category grouping of real estate agents. The trust quality rank, TQR, of the trust issuer is therefore equal to 0.2. Accordingly, the second trust point value, TP2, can be determined, as follows:

$$TP2 = 0.2 \times 200,$$

$$TP2 = 40. \quad (4)$$

In one embodiment, predetermined weightings may optionally be employed to make the trust factor for the trust recipient more heavily focused on either the quantity or the quality of the received trusts, or more equally focused on both the quantity and the quality of the received trusts. For example, a first weighting, W1, relating to the quantity of trusts may be equal to 50% (0.5) or any other suitable value, and a second weighting, W2, relating to the quality of trusts may be equal to 50% (0.5) or any other suitable value, thereby making the trust factor equally focused on the quantity and quality of the received trusts. Using these first and second weightings, W1, W2, a weighted average of the total trust points TP1, TP2, for the trust recipient can be determined, as follows:

Weighted trust point average = $(TP1 \times W1) + (TP2 \times W2)$,

Weighted trust point average = $(100 \times 0.5) + (40 \times 0.5)$,

Weighted trust point average = $50 + 20$,

Weighted trust point average = $70$. (5)

In this example, the trust point rank (TPR) of the trust recipient is determined based on the weighted trust point average for each member of the category grouping of accountants. It is assumed that the category grouping of accountants includes a total of 5 accountants (including the trust recipient). It is further assumed that the weighted trust point averages for these 5 accountants are equal to 530, 380, 335, 250, and 70, respectively. Because, in this example, the weighted trust point average for the trust recipient is equal to 70, the trust point rank (TPR) of the trust recipient corresponds to the $20^{th}$ percentile rank in the category grouping of accountants. The trust factor of the trust recipient can therefore be determined, as follows:

Trust factor = $TPR \times 100$,

Trust factor = $0.2 \times 100$,

Trust factor = $20$. (6)

It is noted that, in the event the trust issuer does not have any trusts with regard to an associated category grouping (or sub-grouping) of the online community (e.g., the trust issuer may be acting in the role of a consumer, and/or may not be promoting him or herself in a particular category grouping or sub-grouping), the total number of contribution points designated, assigned, or otherwise awarded to the trust issuer can be used as a proxy for trust points when determining the trust quality rank (TQR) of the trust issuer.

In the event a member of the online community submits a query to search a database of the online membership community (e.g., to obtain an answer to a certain question, or to identify a provider of a certain service), and, in response to the search query, obtains a listing of search results that makes reference to the trust recipient as a source of information, the rank of the information associated with the trust recipient in the search results can be based at least in part on the value of the trust factor associated with the trust recipient. For example, as the trust factor of the trust recipient increases (from 20 (see equation 6) to, e.g., 40), the rank of the information associated with the trust recipient in the search results will increase. Generally speaking, the higher the rank, the closer to the top of the search results the trust recipient's information will be located. For example, the listing of search results may first be sorted based on relevance, and then sorted based on trust factors, or vice versa. In one embodiment, the online user can change the sort to relevance, trust factor, and/or any other suitable parameter, and/or change the sort order.

Figure 2:
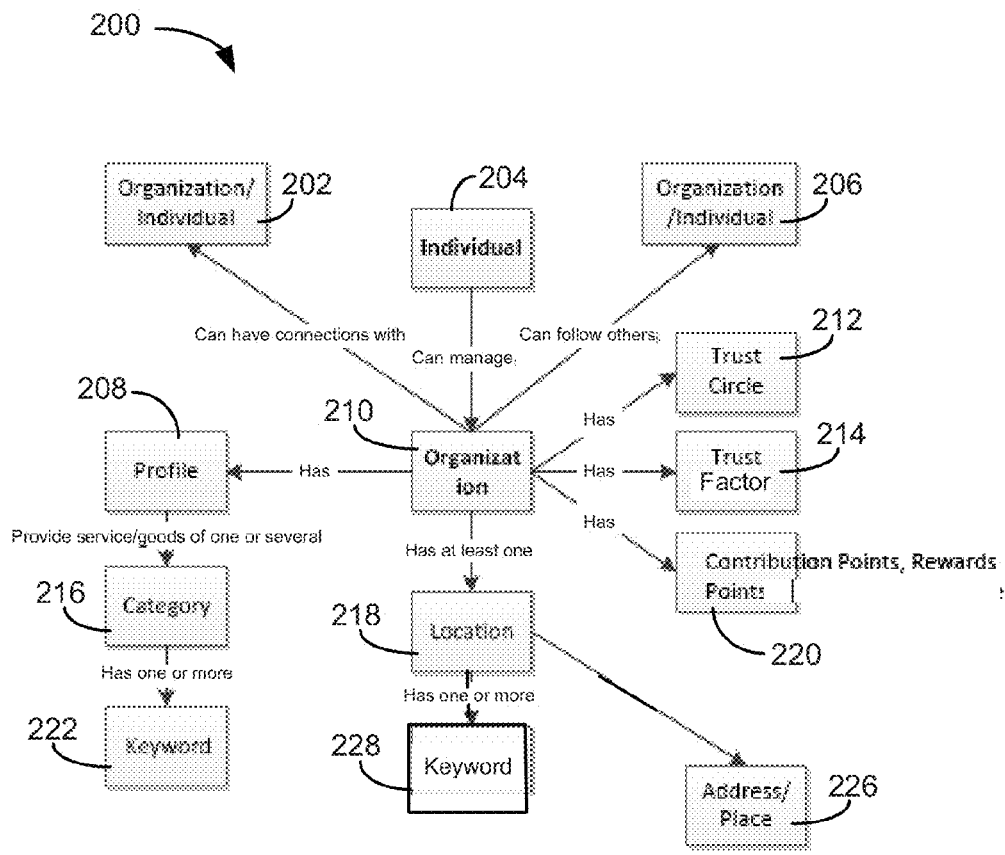
FIG. 2 is a diagram illustrating the functionality and attributes of an exemplary company or organization in a community of online users relative to the system of FIG. 1.

FIG. 2 depicts functionality and attributes 200 of an online user (i.e., an individual 204) in the online membership community relative to the social networking system 101 (see FIG. 1), in which the individual 204 is in his or her capacity as a representative of a company or organization 210. As shown in FIG. 2, the individual 204 can manage the organization 210. Relative to the system 101, the organization 210 can have at least one contact in its network with at least one other organization or individual 202 within the online community, and can optionally follow at least one other organization or individual 206 within the online community. Further, the organization 210 can have a profile 208, which can list at least one service and/or good provided by the organization 210 in a selected category grouping (or sub-grouping) 216. Such a category grouping 216 can have at least one keyword 222 associated therewith for use in searching the online membership database. The organization 210 can be specified to have a location 218, such as a physical address or place 226 and/or a virtual address (e.g., a uniform resource locator (URL)), and can have at least one keyword 228 associated therewith to facilitate searching of the online membership database. Such keywords can be entered by the individual 204 managing the organization 210, as well as by online community members who can provide additional keywords when issuing trusts to the organization 210. The organization 210 can also have an associated trust factor 214, as well as one or more contribution points 220, determined as described hereinabove.

It is noted that the business logic can be executed within the social networking system 101 to award one or more so-called "rewards" points (see reference numeral 220) in response to certain actions performed by the individual 204 within the online community, such as joining the online community, adding contacts to the trust issuer's network within the online community, issuing trusts to other members of the online community, etc. Such rewards points can subsequently be redeemed by the individual 204 and/or others in the organization 210 to purchase certain services and/or merchandise. In one embodiment, such rewards points correspond to contribution points that have not yet been redeemed. It is further noted that the organization 210 can have what is referred to herein as a "trust circle" (see reference numeral 212), which is a graphical representation of selected members of the online community with whom the organization 210 has established trust relationships (as further described herein with reference to FIG. 5).

Figure 3:
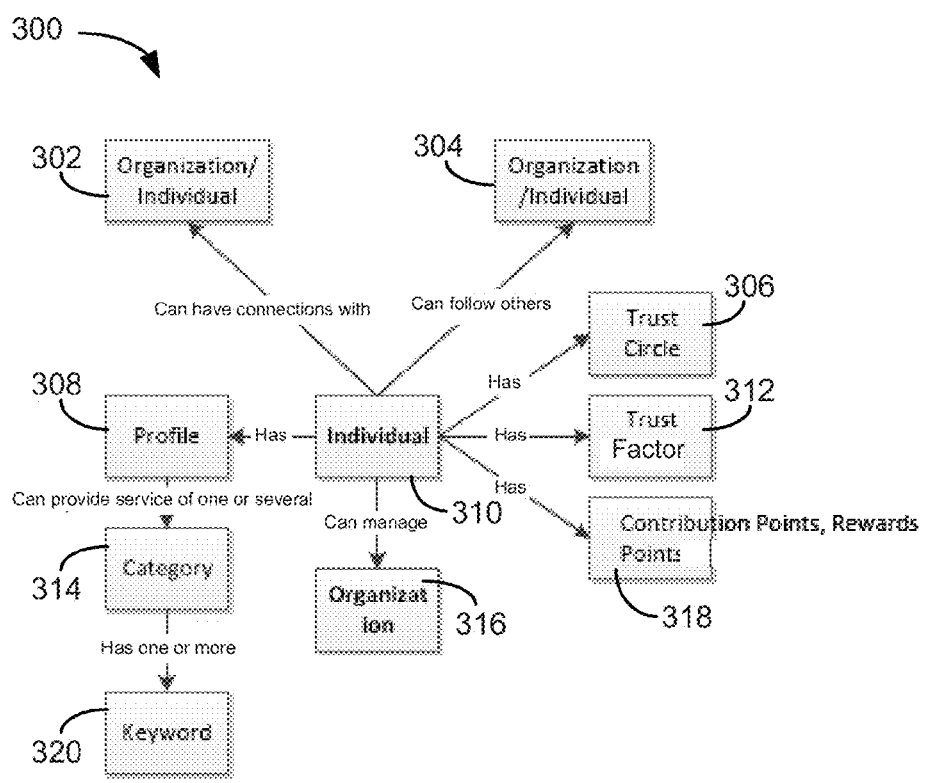
FIG. 3 is a diagram illustrating the functionality and attributes of an exemplary individual in a community of online users relative to the system of FIG. 1.

FIG. 3 depicts functionality and attributes 300 of an online user in the online membership community relative to the social networking system 101 (see FIG. 1), in which the online user is in his or her capacity as an individual 310. As shown in FIG. 3, the individual 310 can manage an organization 316. Relative to the system 101, the individual 310 can have at least one contact in his or her personal network with at least one other organization or individual 302, and can optionally follow at least one other organization or individual 304. Further, the individual 310 can have a profile 308, which can list at least one service provided by the individual 310 in a selected category grouping (or sub-grouping) 314. Such a category grouping 314 can have at least one keyword 320 associated therewith to facilitate searching of the online membership database. The individual 310 can also have an associated trust factor 312 and one or more contribution points and/or rewards points 318 (determined as described hereinabove), as well as a trust circle 306 graphically representing selected members of the online community with whom the individual 310 has established trust relationships (as further described herein with reference to FIG. 5).

Figure 4:
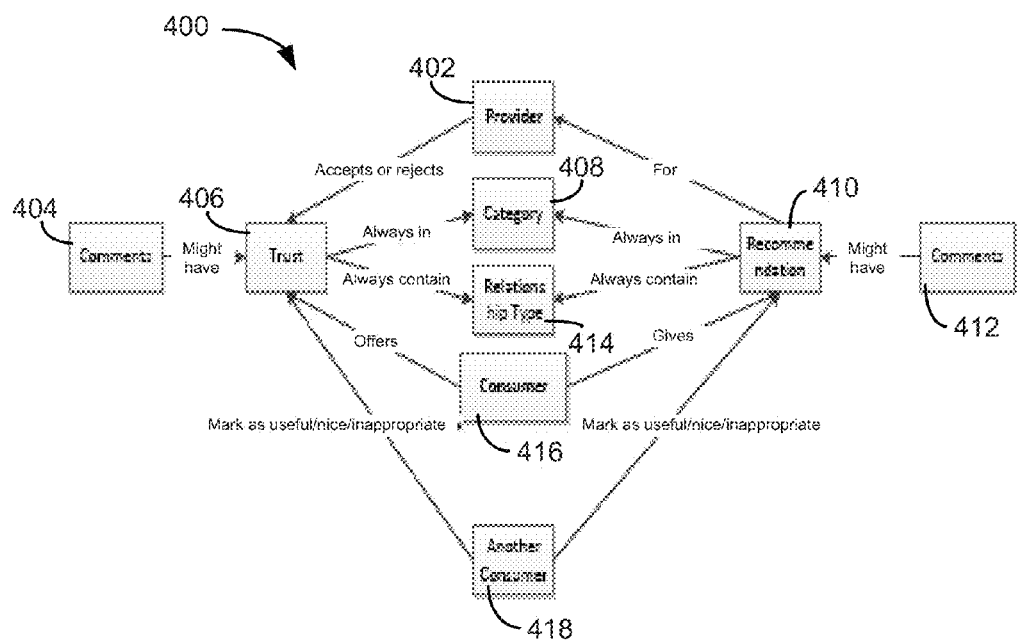
FIG. 4 is a diagram illustrating the functionality and attributes of an exemplary company, organization, or individual in the role of a service provider or a consumer in a community of online users relative to the system of FIG. 1.

FIG. 4 depicts functionality and attributes 400 of an online user in the online membership community relative to the social networking system 101 (see FIG. 1), in which the online user is representative of a company, organization, or individual in the role of a provider 402 of certain services or goods, or a consumer 416 of certain services or goods. As shown in FIG. 4, the consumer 416 can issue a trust 406 to the provider 402, who can subsequently decline to accept the trust 406. The trust 406 is issued to the provider 402 with regard to a certain category grouping (or sub-grouping) 408 in which the provider 402 has chosen to promote himself/herself/itself to the online community members. The consumer 416 can also issue a recommendation 410 to the provider 402, as further discussed below. Like the trust 406, the recommendation 410 is issued to the provider 402 with regard to a certain category grouping (or sub-grouping) 408 in which the provider 402 has chosen to promote himself/herself/itself to the online community members. In one embodiment, indications of the issued trust 406 and/or recommendation 410 can be displayed in association with information of the provider 402 in a listing of search results. Further, the system 101 can be configured to provide a mechanism by which another consumer 418 can mark the issued trust 406 and/or recommendation 410 displayed in the search results as being "useful", "nice", "not appropriate", or any other suitable word or phrase. The system 101 can also be configured to provide mechanisms by which consumers can make comments 404 on the issued trust 406, as well as make comments 412 on the issued recommendation 410.

Figure 5:
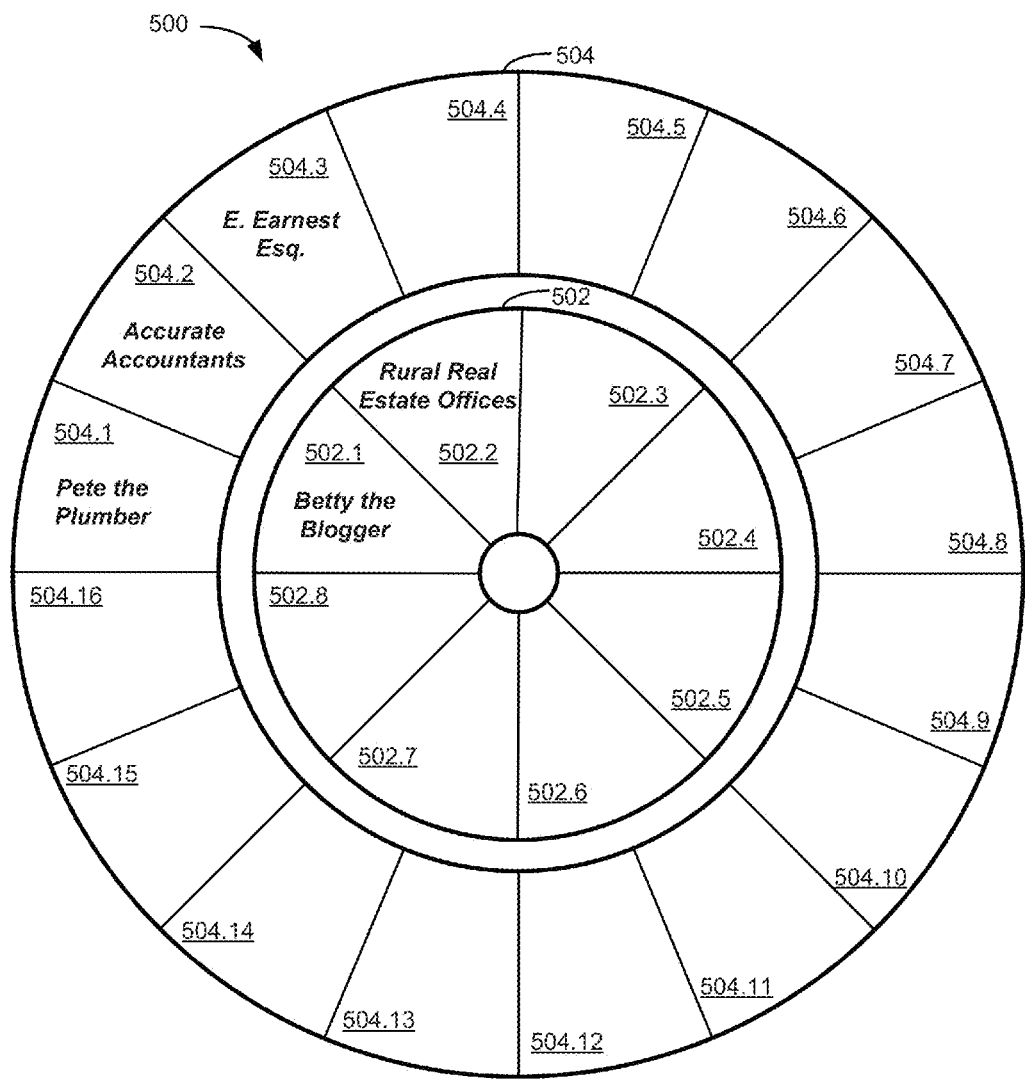
FIG. 5 is a diagram illustrating an exemplary trust circle that an online user of the system of FIG. 1 can make publicly accessible in a community of online users.

FIG. 5 depicts an exemplary trust circle 500 that an online user of the social networking system 101 (see FIG. 1) can make publicly accessible within the community of online users. For example, representations of the trust circle 500 can be visually displayed on displays 102*a*, 104*a* of the user computer and mobile device 102, 104, respectively. As shown in FIG. 5, the trust circle 500 is a graphical representation of members of the online community with whom the online user in his or her capacity as an individual, or as a representative of a company or organization, has established trust relationships. As described herein, the online user can establish such trust relationships by issuing one or more trusts to other online users in the online community, who receive and do not subsequently decline the issued trusts. Alternatively, the online user can establish such trust relationships by receiving and not subsequently declining trusts issued by other online users in the online community.

In one embodiment, the trust circle 500 can include at least an inner trust circle 502, and an outer trust circle 504. The inner trust circle 502 can be partitioned into a first plurality of sections, such as eight (8) sections 502.1-502.8 or any other suitable number of sections. Likewise, the outer trust circle 504 can be partitioned into a second plurality of sections, such as sixteen (16) sections 504.1-504.16 or any other suitable number of sections. Within each section 502.1-502.8, 504.1-504.16, the online user can provide an indication of a selected one of the online membership community with whom he or she has established a trust relationship. For example, in sections 502.1, 502.2 of the inner trust circle 502, the online user can provide indications of two respective members of the online community, namely, Betty the Blogger in section 502.1, and Rural Real Estate Offices in section 502.2. Similarly, in sections 504.1, 504.2, 504.3 of the outer trust circle 504, the online user can provide indications of three additional members of the online community, namely, Pete the Plumber in section 504.1, Accurate Accountants in section 504.2, and E. Earnest Esq. in section 504.3. For example, the online user may choose to provide indications of his or her most trusted resources within the various sections 502.1-502.8 of the inner trust circle 502, while providing indications of resources that may have not yet earned the online user's utmost trust and confidence within the various sections 504.1-504.16 of the outer trust circle 504.

By allowing an online user to provide a graphical representation of his or her trusted resources within an online membership community in the form of the trust circle 500 (see FIG. 5), the social networking system 101 can provide an incentive to the online user to establish trust relationships with various members of the online community. As successively more trust relationships are established with the various online community members, the online user can provide indications of those trust relationships in the respective sections of the trust circle 500, until each section 502.1-502.8, 504.1-504.16 of the inner and outer trust circles 502, 504 is occupied by the indication of a trusted resource. Moreover, the online user can hold up certain ones of his or her trusted resources as examples of resources that have gained the online user's utmost trust and confidence, by providing indications of those trusted resources within the various sections 502.1-502.8 of the inner trust circle 502. In this way, the online user can graphically communicate his or her established trust relationships as a network of trust (also referred to herein as a "trust network") to the online membership community.

Figure 6:
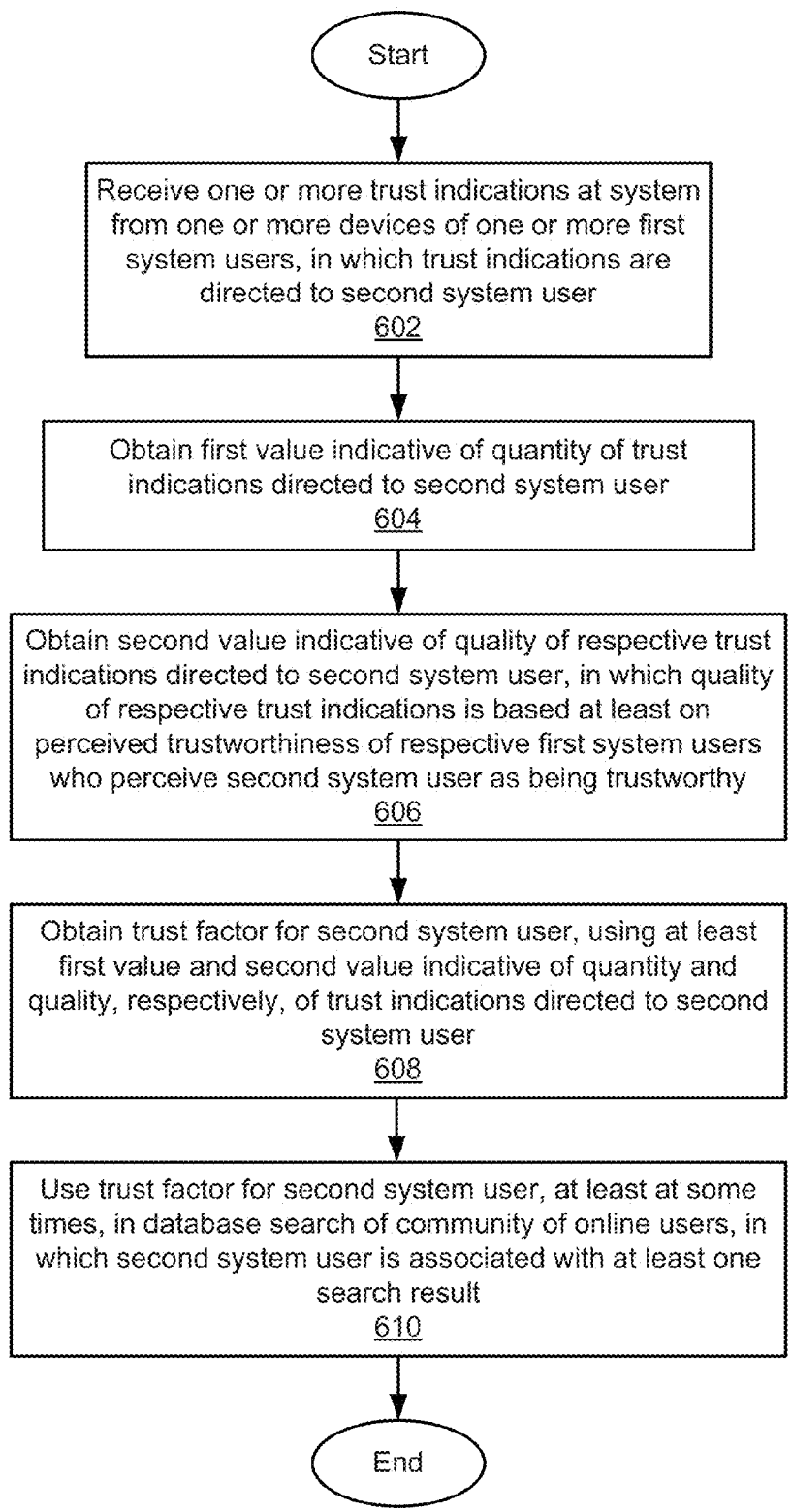
FIG. 6 is a flow diagram illustrating an exemplary method of establishing and measuring trust relationships in a community of online users, using the system of FIG. 1.

FIG. 6 depicts an exemplary method of establishing and measuring trust relationships in a community of online users, using the social networking system 101 (see FIG. 1). As depicted in block 602, one or more trust indications can be received at the system 101 from one or more devices of one or more first system users, in which the trust indications are directed to a second system user. The respective trust indications are configured to indicate that the first system users perceive the second system user as being trustworthy. As depicted in block 604, a first value indicative of the quantity of trust indications directed to the second system user is obtained by the system 101. As depicted in block 606, a second value indicative of the quality of the respective trust indications directed to the second system user is obtained by the system 101, in which the quality of the respective trust indications is based at least on a perceived trustworthiness of the respective first system users who perceive the second system user as being trustworthy. As depicted in block 608, a trust factor for the second system user is obtained by the system 101, using at least the first value and the second value indicative of the quantity and the quality, respectively, of the trust indications directed to the second system user. As depicted in block 610, the trust factor for the second system user is used, at least at some times, in a database search of the community of online users, in which the second system user is associated with at least one search result.

Having described the above exemplary embodiments, further variations and/or modifications can be made and/or practiced. For example, in one embodiment, an online user can issue a recommendation indication (also referred to herein as a "recommendation") to a member of an online community, or receive a recommendation from the member of the online community. Like a trust, such a recommendation is defined herein as an electronic entity (e.g., an aggregation of data) configured to indicate that the recipient of the recommendation (the "recommendation recipient") is considered to be worthy of confidence. By allowing an online user to issue trusts and recommendations, the disclosed systems and methods provide a mechanism by which the online user can assign various levels of trust to resources within or outside of the online community. For example, in the disclosed systems and methods, a recommendation indication may represent a lesser level of trust than a trust indication.

In the event a trust recipient has received one or more recommendations in addition to receiving one or more trusts, the business logic can be executed within the system 101 to calculate, compute, generate, obtain, or otherwise determine a number of trust points (or weighted trust points) for the trust recipient based on the number and quality of trusts received by the trust recipient, as well as the number and quality of recommendations received by the trust recipient. Like the quality of a trust, the quality of a recommendation can be determined based at least in part on the current total number of trusts received by (or the current total number of contribution points awarded to) the issuer of the recommendation (the "recommendation issuer"). Using the number of trust points (or weighted trust points) for the trust recipient, a trust point rank as well as a trust factor can then be determined for the trust recipient, as described hereinabove.

In further embodiments, other factors or considerations may be taken into account in the determination of trust points and/or a trust factor for a trust recipient. For example, in one embodiment, the verification or validation of certain designations, credentials, or certifications of professionals (e.g., certified public accountants (CPAs) versus non-CPAs) may influence the selection of point values used in conjunction with at least one of the trust point values (TP1, TP2) discussed hereinabove. Alternatively, predetermined numbers of points may be added to one or both of the trust point values (TP1, TP2) to account for such designation/certification verification of professionals. In another embodiment, predetermined numbers of points may be added to one or more of the trust point values (TP1, TP2) based on certain third party data obtained from particular APIs (also referred to herein as "third party API data") directed to the trust recipient.

In another embodiment, trust quality ranks (TQRs), trust point ranks (TPRs), and trust factors for companies or organizations can be determined at a "size" and/or a "category" level. For example, the social networking system 101 can be configured to regard a large retailer as a "1,000 Employee Plus—General Retailer", while regarding a small shop owner as a "1-10 Employee—General Retailer". As such, the social networking system 101 would not compare the large retailer with the small shop owner for the purpose of determining trust factors.

In still another embodiment, if an individual or a company/organization changes the category grouping in which they are promoting themselves to the members of the online community, then the social networking system 101 can be configured to save the data relating to trusts received by these users in their original categories, and employ that data in the future in the event the individual or company/organization returns to their original category grouping. However, the social networking system 101 will proceed to determine trust factors for these users with respect to their new category groupings. As such, all trusts subsequently received by these users will carry the weightings and the ranks appropriate to the new category groupings rather than the old category groupings, when determining the impact of trust factors of other system users.

It is noted that some portions of the preceding description may be viewed as being presented in terms of algorithms and/or symbolic representations of operations on data within a computer memory. Such algorithms are generally conceived to be sequences of operations leading to a desired result. Further, such operations are generally those requiring physical manipulations of physical quantities. Usually, though not necessarily, such quantities take the form of electrical or magnetic signals capable of being stored, transferred, combined, compared, and/or otherwise manipulated. Such signals can be referred to using terms such as bits, values, elements, symbols, characters, numbers, or the like.

Moreover, unless specifically stated otherwise, terms such as "processing", "computing", "calculating", "generating", "obtaining", "determining", "displaying", or the like, refer to the actions and/or processes of a computer system or similar computerized device that manipulates and transforms data, represented as physical quantities (electronic, magnetic) within the computer system's registers and/or memories, into other data similarly represented as physical quantities within the computer system's registers and/or memories, or other such information storage, transmission, and/or display devices.

The present application also relates to an apparatus or system for performing the operations described herein. Such an apparatus or system may be specially constructed for the required purpose, or it may comprise a general-purpose computer selectively activated or reconfigured by a computer program stored within the computer. Such a computer program may be stored in a machine-accessible medium, also referred to herein as a computer-readable medium, such as, but not limited to, any suitable type of disk including floppy disks, optical disks, CD-ROMs, and/or magnetic-optical disks, read-only memories (ROMs), random access memories (RAMs), EPROMs, EEPROMs, magnetic or optical cards, and/or any suitable type of media for storing electronic instructions, each such media being communicably coupleable to a system bus.

It is noted that the processes described herein are not inherently related to any particular computer or other apparatus. Various general-purpose systems may be used with programs in accordance with the teachings disclosed herein, or it may prove convenient to construct a more specialized apparatus to perform the operations disclosed herein. The required structure for a variety of such systems will be evident from the above description. In addition, the present application is not described with reference to any particular programming language. It will be appreciated that a variety of programming languages may be used to implement the teachings disclosed herein.

It will be appreciated by those of ordinary skill in the art that modifications to and variations of the above-described systems and methods may be made without departing from the inventive concepts disclosed herein. Accordingly, the invention should not be viewed as limited except as by the scope and spirit of the appended claims.

What is claimed is:

1. A computer-implemented method, comprising:
   receiving, from one or more computerized devices of one or more online users of a social networking system, one or more first trust indications directed to a specified resource within an online community, each of the one or more first trust indications including an aggregation of data configured to indicate that the specified resource is perceived as being a trustworthy resource by an online user sender of the first trust indication;
   receiving, from at least one of the one or more computerized devices of the one or more online users, one or more second trust indications directed to the respective online users that perceive the specified resource as being the trustworthy resource, each of the one or more second trust indications including a further aggregation of data configured to indicate that an online user recipient of the second trust indication is perceived as being a trustworthy user within the online community notwithstanding the specified resource being perceived as the trustworthy resource by the online user recipient, each of the first and second trust indications defined by an electronic entity adapted for network transmission;
   calculating a first value representing a measure of a quantity of the one or more first trust indications directed to the specified resource;
   calculating a second value representing a measure of a quality of the respective first trust indications directed to the specified resource, the quality of the respective first trust indications being based at least on a perceived trustworthiness of the respective online users that perceive the specified resource as being the trustworthy resource, the perceived trustworthiness of each online user being based at least on a total number of the one or more second trust indications directed to the online user;
   calculating a trust factor for the specified resource based at least on the first value and the second value representing measures of the quantity and the quality, respectively, of the one or more first trust indications directed to the specified resource;
   responsive to receiving a query from a computerized device of the online user to search a database of the online community, obtaining a listing of search results that makes reference to the specified resource as a source of information; and
   sending the listing of search results to the computerized device of the online user, a rank of the information associated with the specified resource in the search results being based at least in part on the trust factor for the specified resource.

2. The method of claim 1 wherein the one or more online users are each associated with a user category group within the online community, and wherein the calculating of the second value representing the measure of the quality of the respective first trust indications directed to the specified resource includes calculating the second value representing the measure of the quality of the respective first trust indications based at least on total numbers of second trust indications received by the respective online users with regard to their associated user category groups.

3. The method of claim 2 wherein the calculating of the second value representing the measure of the quality of the respective first trust indications directed to the specified resource includes calculating trust rankings for the respective online users based at least on the total numbers of second trust indications received by the respective online users with regard to their associated user category groups.

4. The method of claim 3 wherein the specified resource is associated with a category group, and wherein the calculating of the trust factor for the specified resource includes calculating a trust ranking for the specified resource with regard to the category group associated with the specified resource, the trust factor being based on the trust ranking of the specified resource with regard to the category group associated with the specified resource.

5. The method of claim 1 further comprising:
   receiving, from a third party application, third party application programming interface (API) data directed to the specified resource.

6. The method of claim 5 wherein the calculating of the first value representing the measure of the quantity of the one or more first trust indications directed to the specified resource includes adjusting the first value representing the measure of the quantity of the one or more first trust indications directed to the specified resource based on the third party API data.

7. The method of claim 6 wherein the calculating of the second value representing the measure of the quality of the respective first trust indications directed to the specified resource includes adjusting the second value representing the measure of the quality of the first respective trust indications directed to the specified resource based on the third party API data.

8. The method of claim 1 wherein the calculating of the second value representing the measure of the quality of the respective first trust indications directed to the specified resource includes, in the event no trust indications are received by at least one of the respective online users, calculating the second value representing the measure of the quality of at least one of the one or more first trust indications directed to the specified resource based on a total number of contribution points awarded to the respective online user that received no trust indications, the contribution points being awarded in response to certain actions performed by the respective online user within the online community.

9. The method of claim 1 wherein the specified resource has an associated capacity within the online community, the capacity of the specified resource within the online community being one of an individual and a representative of a company or organization, and wherein the calculating of the first value representing the measure of the quantity of the one or more first trust indications directed to the specified resource includes adjusting the first value by a first point value based on the capacity of the specified resource within the online community.

10. The method of claim 9 wherein the calculating of the second value representing the measure of the quality of the respective first trust indications directed to the specified resource includes adjusting the second value by a second point value based on the capacity of the specified resource within the online community.

11. The method of claim 1 further comprising:
upon receiving the one or more first trust indications from the one or more computerized devices of the one or more online users, establishing one or more trust relationships between the specified resource and one or more of the respective online users; and
sending instructions to the computerized device of the online user to display a graphical representation of the trust relationships between the specified resource and the respective online users.

12. The method of claim 11 wherein the sending of the instructions to display the graphical representation of the trust relationships between the specified resource and the respective online users includes sending the instructions to display the graphical representation of a trust circle, the trust circle having a plurality of sections, each of the plurality of sections providing an indication of a selected one of the trust relationships established between the specified resource and the respective online users.

13. The method of claim 12 wherein the sending of the instructions to display the graphical representation of the trust circle includes sending the instructions to display the graphical representation of the trust circle including an inner trust circle and an outer trust circle, each of the inner and outer trust circles having a plurality of subsections, each of the plurality of subsections providing an indication of a selected one of the trust relationships established between the specified resource and the respective online users.

14. A system, comprising:
a processor; and
a non-transitory computer-readable storage medium coupled to the processor, the non-transitory computer-readable storage medium including instructions executable by the processor to perform steps comprising:
receiving, from one or more computerized devices of one or more online users of a social networking system, one or more first trust indications directed to a specified resource within an online community, each of the one or more first trust indications including an aggregation of data configured to indicate that the specified resource is perceived as being a trustworthy resource by an online user sender of the first trust indication;
receiving, from at least one of the one or more computerized devices of the one or more online users, one or more second trust indications directed to the respective online users that perceive the specified resource as being the trustworthy resource, each of the one or more second trust indications including a further aggregation of data configured to indicate that an online user recipient of the second trust indication is perceived as being a trustworthy user within the online community notwithstanding the specified resource being perceived as the trustworthy resource by the online user recipient, each of the first and second trust indications defined by an electronic entity adapted for network transmission;
calculating a first value representing a measure of a quantity of the one or more first trust indications directed to the specified resource;
calculating a second value representing a measure of a quality of the respective first trust indications directed to the specified resource, the quality of the respective first trust indications being based at least on a perceived trustworthiness of the respective online users that perceive the specified resource as being the trustworthy resource, the perceived trustworthiness of each online user being based at least on a total number of the one or more second trust indications directed to the online user;
calculating a trust factor for the specified resource based at least on the first value and the second value representing measures of the quantity and the quality, respectively, of the one or more first trust indications directed to the specified resource;
responsive to receiving a query from a computerized device of the online user to search a database of the online community, obtaining a listing of search results that makes reference to the specified resource as a source of information; and
sending the listing of search results to the computerized device of the online user, a rank of the information associated with the specified resource in the search results being based at least in part on the trust factor for the specified resource.

15. The system of claim 14 wherein the non-transitory computer-readable storage medium further includes instructions executable by the processor to perform steps comprising:
upon receiving the one or more first trust indications from the one or more computerized devices of the one or more online users, establishing one or more trust relationships between the specified resource and one or more of the respective online users; and
sending instructions to the computerized device of the online user to display a graphical representation of the trust relationships between the specified resource and the respective online users.

16. The system of claim 15 wherein the non-transitory computer-readable storage medium further includes instructions executable by the processor to perform steps comprising:
sending the instructions to display the graphical representation of a trust circle, the trust circle having a plurality of sections, each of the plurality of sections providing an indication of a respective one of the trust relationships established between the specified resource and the respective online users.

17. A computer program product comprising a non-transitory computer-readable storage medium containing computer program code for:
receiving, from one or more computerized devices of one or more online users of a social networking system, one or more first trust indications directed to a specified resource within an online community, each of the one or more first trust indications including an aggregation of data configured to indicate that the specified resource is perceived as being a trustworthy resource by an online user sender of the first trust indication;
receiving, from at least one of the one or more computerized devices of the one or more online users, one or more second trust indications directed to the respective online users that perceive the specified resource as being the trustworthy resource, each of the one or more second trust indications including a further aggregation of data configured to indicate that an online user recipient of the second trust indication is perceived as being a trustworthy user within the online community, notwithstanding the specified resource being perceived as the trustworthy resource by the online user recipient, each of the first and second trust indications defined by an electronic entity adapted for network transmission;

calculating a first value representing a measure of a quantity of the one or more first trust indications directed to the specified resource;

calculating a second value representing a measure of a quality of the respective first trust indications directed to the specified resource, the quality of the respective first trust indications being based at least on a perceived trustworthiness of the respective online users that perceive the specified resource as being the trustworthy resource, the perceived trustworthiness of each online user being based at least on a total number of the one or more second trust indications directed to the online user;

calculating a trust factor for the specified resource based at least on the first value and the second value representing measures of the quantity and the quality, respectively, of the one or more first trust indications directed to the specified resource;

responsive to receiving a query from a computerized device of the online user to search a database of the online community, obtaining a listing of search results that makes reference to the specified resource as a source of information; and sending the listing of search results to the computerized device of the online user, a rank of the information associated with the specified resource in the search results being based at least in part on the trust factor for the specified resource.

18. The computer program product of claim 17 wherein the non-transitory computer-readable storage medium further contains computer program code for:

upon receiving the one or more first trust indications from the one or more computerized devices of the one or more online users, establishing one or more trust relationships between the specified resource and one or more of the respective online users; and sending instructions to the computerized device of the online user to display a graphical representation of the trust relationships between the specified resource and the respective online users.

19. The computer program product of claim 18 wherein the non-transitory computer-readable storage medium further contains computer program code for:

sending the instructions to display the graphical representation of a trust circle, the trust circle having a plurality of sections, each of the plurality of sections providing an indication of a respective one of the trust relationships established between the specified resource and the respective online users.

* * * * *